US010935499B2

(12) United States Patent
Heineman et al.

(10) Patent No.: US 10,935,499 B2
(45) Date of Patent: Mar. 2, 2021

(54) HYDROGEN SENSITIVE FILMS AND SENSORS PRODUCED THEREFROM

(71) Applicant: University Of Cincinnati, Cincinnati, OH (US)

(72) Inventors: William R. Heineman, Cincinnati, OH (US); John A. Lynch, Dayton, OH (US); Daniel P. Rose, Cincinnati, OH (US); Julia Kuhlmann, Cincinnati, OH (US); Daoli Zhao, North Brunswick, NJ (US); Peng Zhang, Cincinnati, OH (US); Michael E. Smith, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 309 days.

(21) Appl. No.: 16/143,992

(22) Filed: Sep. 27, 2018

(65) Prior Publication Data

US 2019/0094147 A1    Mar. 28, 2019

Related U.S. Application Data

(60) Provisional application No. 62/563,745, filed on Sep. 27, 2017.

(51) Int. Cl.
*G01N 21/78* (2006.01)
*G01N 21/31* (2006.01)
(Continued)

(52) U.S. Cl.
CPC ......... *G01N 21/783* (2013.01); *C08K 5/0041* (2013.01); *C08K 5/357* (2013.01);
(Continued)

(58) Field of Classification Search
CPC ............... G01N 21/783; G01N 21/314; G01N 21/8914; G01N 21/8483;
(Continued)

(56) References Cited

U.S. PATENT DOCUMENTS

| 4,680,268 A * | 7/1987 | Clark, Jr. | ............... C12Q 1/005 204/403.09 |
| 8,591,818 B2 | 11/2013 | Bokerman et al. | |

(Continued)

OTHER PUBLICATIONS

Seo, T. et al., A convenient method for determining the concentration of hydrogen in water: use of methylene blue with colloidal platinum, Medical Gas Research 2012, 2:1.
(Continued)

*Primary Examiner* — Nathaniel T Woodward
(74) *Attorney, Agent, or Firm* — Wood Herron & Evans LLP

(57) ABSTRACT

Described are sensors and methods of detecting hydrogen gas. The sensor includes a polymer matrix and a dye molecule in an amount sufficient such that exposure of the polymer matrix to hydrogen gas causes a change in a spectroscopic property of the dye molecule wherein the spectroscopic property includes at least one of color, absorbance, or luminescence. The polymer matrix may further include a catalyst, such as a transition metal, sulfonated Wilkinson's catalyst, colloidal Pt, sulfonated iridium cyclooctadiene triphenylphosphine, sulfonated rhodium cyclooctadiene triphenylphosphine, sulfonated ruthenium triphenylphosphine, or combinations thereof. Embodiments of the sensor may further include a gas permeable, water impermeable membrane, an outer covering, or combinations thereof.

19 Claims, 8 Drawing Sheets

(51) Int. Cl.
  *G01N 21/89* (2006.01)
  *C08L 27/18* (2006.01)
  *C08K 5/46* (2006.01)
  *C08L 5/12* (2006.01)
  *C08K 5/357* (2006.01)
  *C08K 5/00* (2006.01)
  *G01N 21/77* (2006.01)
  *G01N 21/84* (2006.01)

(52) U.S. Cl.
  CPC .................. *C08K 5/46* (2013.01); *C08L 5/12* (2013.01); *C08L 27/18* (2013.01); *G01N 21/314* (2013.01); *G01N 21/8914* (2013.01); *G01N 21/8483* (2013.01); *G01N 2021/3155* (2013.01); *G01N 2021/775* (2013.01); *G01N 2021/7756* (2013.01); *G01N 2021/7786* (2013.01); *G01N 2021/8918* (2013.01)

(58) Field of Classification Search
  CPC ... G01N 2021/8918; G01N 2021/3155; G01N 2021/775; G01N 2021/7756; G01N 2021/7786; C08K 5/0041; C08K 5/46; C08K 5/357; C08L 27/18; C08L 5/12
  USPC .......................................................... 73/1.06
  See application file for complete search history.

(56) References Cited

U.S. PATENT DOCUMENTS

| | | | | |
|---|---|---|---|---|
| 9,422,160 | B1* | 8/2016 | Hoagland | B82Y 30/00 |
| 2004/0050143 | A1* | 3/2004 | Hoagland | G01N 31/10 |
| | | | | 73/31.05 |
| 2007/0224081 | A1* | 9/2007 | Bokerman | G01N 21/783 |
| | | | | 422/400 |
| 2007/0251822 | A1* | 11/2007 | Hoagland | G01N 31/22 |
| | | | | 204/424 |
| 2015/0260656 | A1* | 9/2015 | Zilberstein | G01N 21/274 |
| | | | | 436/165 |
| 2016/0252486 | A1* | 9/2016 | Hoagland | G01M 3/20 |
| | | | | 436/3 |
| 2017/0102337 | A1* | 4/2017 | Benson | G01N 33/0044 |

OTHER PUBLICATIONS

Zhao, D. et al., In vivo characterization of magnesium alloy biodegradation using electrochemical H2 monitoring, ICP-MS, and XPS, Acta Biomaterialia, 50, 556-565, 2017.

Zhao, D. et al., In vivo monitoring the biodegradation of magnesium alloys with an electrochemical H2 sensor, Acta Biomaterialia, 36, 361-368, 2016.

Zhao, D. et al., Visual H2 sensor for monitoring biodegradation of magnesium implants in vivo, Acta Biomaterialia, 45, 399-409, 2016.

* cited by examiner

HYDROGEN SENSITIVE FILMS AND SENSORS PRODUCED THEREFROM

STATEMENT REGARDING FEDERALLY SPONSORED RESEARCH OR DEVELOPMENT

This present invention was made, at least in part, with support from the U.S. Government and funds identified as Award No. EEC-0812348 awarded by the National Science Foundation. The government has certain rights in the invention.

FIELD

The present invention relates to hydrogen gas sensitive films and more particularly to hydrogen gas sensors including hydrogen gas sensitive films.

BACKGROUND

The use of surgical screws and plates is increasingly common in orthopedic procedures such as the repair of broken bone. Advances in their design now allow doctors to manipulate and stabilize bone (internal fixation) to a degree often not possible with less invasive methods, such as splints or regulators. It is estimated that in excess of 1 million procedures involving the use of surgical screws or plates are performed in the U.S. each year.

Currently, surgical screws and plates are made of durable metal alloys, typically steel or titanium, which resist degradation in the body. While beneficial in the short term, the persistence of these implants often necessitates additional surgeries to remove them, either as part of a therapeutic plan, or as an intervention when their presence causes further medical problems—sometimes years after the initial surgery. Obviating the need for these additional costly, invasive procedures would represent a welcome paradigm-shift in the field.

Surgical implants made of magnesium alloys have been the subject of a push by industry and research institutions as a candidate to replace current products. A magnesium alloy surgical screw for repairing bunions has begun to see limited clinical use in Europe. Implants made of magnesium degrade slowly over time, devolving into soluble magnesium ions and generating hydrogen gas in the process. Over a period of a few weeks or months or longer the implants degrade completely, leaving repaired bone and eliminating the possibility of further complications from the implant or the need of additional surgeries to remove a permanent metal implant.

A limitation of these new magnesium alloy implants is the difficulty of imaging them in vivo. It will be desirable, and possibly necessary, to periodically monitor the state of the magnesium implants to assay their degree of degradation. Unlike the much denser materials currently used in steel or titanium implants, magnesium alloy implants are much closer to the density of bone, making it hard, if not impossible, to accurately image them with traditional X-ray. MRI can be used, but is much more expensive and inconvenient. A convenient, cost-effective method to monitor the state of magnesium alloy implants as they dissolve away will be a key enabling technology valuable for these implants.

The NSF has funded an Engineering Research Center on Revolutionizing Metallic Biomaterials to develop biodegradable metals for use as medical implants such as plates and screws for broken bone repair and screws for ACL repair. The metal that is being developed for that program is magnesium (Mg) because it is strong and light weight, its corrosion rate can be controlled by forming alloys and by surface treatment with appropriate biodegradable coatings, and it biodegrades by reacting with water to form soluble magnesium ion ($Mg^{2+}$) which is an essential mineral:

$$Mg+2H_2O \rightarrow Mg^{2+}+2OH^-+H_2$$

During the corrosion of Mg in an aqueous environment like the human body, the corroding Mg reacts with water, and hydrogen gas ($H_2$) is evolved. Consequently, the formation of gas cavities after implantation of Mg alloys has been widely reported in literature. However, the gas composition and the concentration of $H_2$ in these bubbles were not clearly known as only a few studies using techniques not specific for $H_2$ were done when Mg was first tested as an implant about 60 years ago. Little had been done since that time and most researchers just assumed that these cavities contain primarily $H_2$. In order to test this assumption, we implanted rapidly degrading rare earth-containing Mg alloy discs under the skin of mice and determined the concentration of $H_2$ gas using an electrochemical amperometric $H_2$ sensor and confirmed the results with mass spectrometry. $H_2$ concentration was monitored over a period of 10 days.

Two significant discoveries were made: (1) the concentration of $H_2$ in the bubbles is very low, even shortly after formation of the cavities. To confirm these results, $H_2$ gas was directly injected subcutaneously and most of the $H_2$ gas was found to exchange with the surrounding tissue within the first hour after injection. These results disproved the common belief that these cavities mainly contain $H_2$ and show how quickly this gas is exchanged with the surrounding tissue. (2) Measurements made noninvasively by just pressing the sensor against the skin covering the implant are very similar to those made invasively by inserting the sensor inside the bubble. This observation is consistent with fast transport of $H_2$ through the skin. The ability to monitor the degradation rate of Mg implanted subcutaneously in mice using the amperometric $H_2$ sensor with various alloys of Mg that corrode at different rates has subsequently been reported. The measurements were made noninvasively and quickly by simply touching the sensor probe tip to the skin for about a minute. Hydrogen concentrations determined in this way correlated with degradation rate as determined by the standard weight loss method. This established the ability to monitor degradation of an implant by measuring hydrogen levels at the surface of the skin over the implant. We then demonstrated that visual sensor strips from Element One, Inc. could be used in a similar way to monitor the corrosion via a color change. However, this visual sensor had the disadvantage of a very slow response of up to 2 hours for a measurement.

SUMMARY

In order to address the shortcomings discussed above and to obtain a visual sensor for hydrogen gas for the application described above that possesses adequate sensitivity and responds rapidly and is easy to use, described herein is a composite film consisting of a polymer matrix incorporating a substance(s) that changes spectroscopic properties in the presence of hydrogen gas ($H_2$). Embodiments of the invention are directed to sensors produced from the hydrogen gas sensitive film. When applied to the external surface adjacent to a biodegradable metal implant such as a magnesium alloy implant, this sensor can provide an image of the evolved hydrogen gas and help to assess the dissolution of the underlying biodegradable metal implant. With calibration, the hydrogen gas sensor can provide an estimate of the rate of dissolution of the underlying biodegradable metal implant. Both kinds of information can be helpful in the orthopedic operation aftercare. Such a sensor would also be useful in other application areas such as $H_2$ leak detection from $H_2$ generation or storage devices and associated $H_2$ transport infrastructure such as piping as well as in diagnostic devices for use in diagnosing conditions wherein $H_2$ is indicative of a medical condition. For example, embodiments of the hydrogen gas sensor may be used to detect $H_2$ in breath, such as for diagnosis of lactose intolerance where rapid detection of $H_2$ at low levels by a very simple visual sensor is needed.

All examples described herein are for the purposes of illustration and should not be construed as limiting the scope of the invention.

BRIEF DESCRIPTION OF THE DRAWINGS

The objects and advantages of the present invention will be further appreciated in light of the following detailed descriptions and drawings in which.

DESCRIPTION

Figure 1:
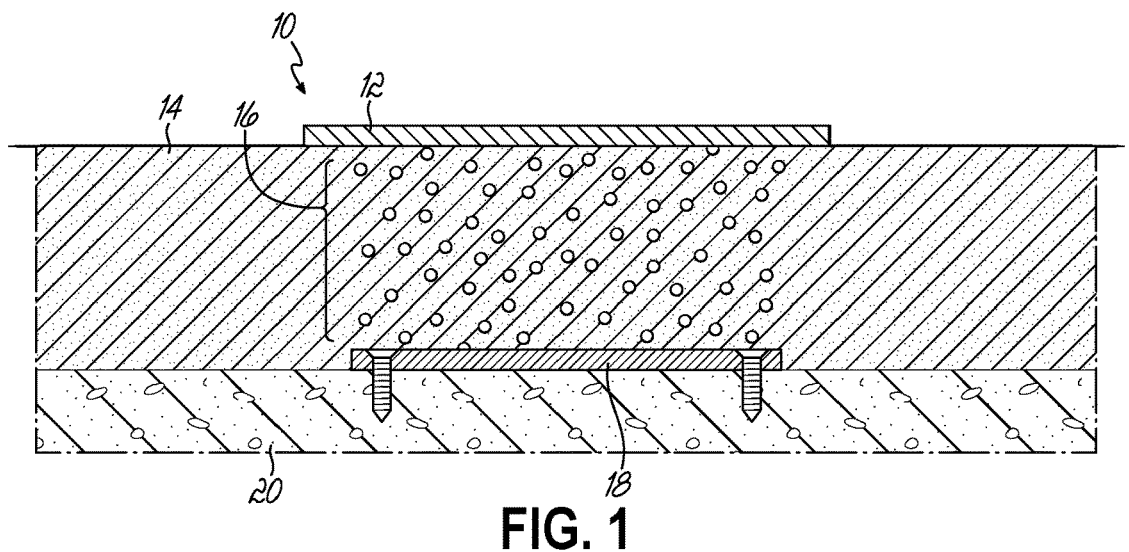
FIG. 1 is a cross-sectional view of a device according to an embodiment of the invention.

An embodiment of the present invention is a hydrogen gas ($H_2$) sensor 10, 100, 200 comprised of a polymer matrix incorporating a compound ("dye molecule") or mixture of compounds whose chromatic or fluorescent properties change on exposure to hydrogen gas. In embodiments of the invention, the polymer matrix includes a catalyst in addition to a dye molecule.

The polymer matrix 12 is permeable to hydrogen gas and allows for detection of chromatic or fluorescent property changes in the dye molecule. In embodiments, the polymer matrix 12 may be hydrated to facilitate catalyst mediated electron transport. Exemplary polymer matrix materials include Nafion™ copolymer-fluoropolymer, the polysaccharide agarose, sulfonated polystyrene-block-poly(ethylene-ran-butylene)-block-polystyrene, poly(vinylbenzene trimethylammonium) chloride, poly(dimethyldiallylammonium chloride), poly(styrenesulfonic acid), quaternized poly(4-vinylpyridine), polyvinyl alcohol, or polyacrylic acid. Incorporation of the dye molecule and optional catalyst into the polymer matrix 12 may be accomplished prior to casting, such by mixing the dye molecule or the dye molecule and catalyst with the polymer before polymerization to form the matrix, or after the matrix is formed, such as by diffusion of the dye molecule or the dye molecule and catalyst into the matrix. In embodiments, the polymer matrix 12 is in the form of a film.

In an embodiment, the dye molecule is a compound whose chromatic and fluorescent properties are determined by its oxidation state. Exemplary dye molecules include methylthioninium chloride (methylene blue), resazurin ($C_{12}H_6NNaO_4$), neutral red, methyl orange, crystal violet, Victoria blue, Evan's blue, bromophenol blue, thymol blue, orange II, and combinations thereof.

In an embodiment, the dye molecule is included into the polymer matrix in a range from 0.01 μM to 10 μM. In another embodiment, the dye molecule is included into the polymer matrix in a range from 0.1 μM to 10 μM. In another embodiment, the dye molecule is included into the polymer matrix in a range from 0.1 μM to 5 μM. In another embodiment, the dye molecule is included into the polymer matrix in a range from 0.1 μM to 1 μM. In another embodiment, the dye molecule is included into the polymer matrix in a range from 0.1 μM to 0.5 μM. In another embodiment, the dye molecule is included into the polymer matrix in a range from 1 μM to 5 μM. In embodiments of the invention, the dye molecule may be included in the polymer matrix with one or more catalysts.

In an embodiment, the catalyst includes transition metal particles, sulfonated Wilkinson's catalyst, colloidal Pt, sulfonated iridium cyclooctadiene triphenylphosphine, sulfonated rhodium cyclooctadiene triphenylphosphine, sulfonated ruthenium triphenylphosphine, or combinations thereof. Exemplary transition metal particles include gold (Au), palladium (Pd), platinum (Pt), ruthenium (Ru), rhodium (Rh), iridium (Ir) or combinations thereof. In embodiments, the transition metal particles include primarily one transition metal that is not gold and in other embodiments, the transition metal particles include two or more transition metals. In an embodiment, the transition metal particles are bimetallic, such as gold-palladium bimetallic particles. In embodiments of the invention, the catalyst includes nanoscale particles. In another embodiment, the catalyst includes microscale particles. In another embodiment, the catalyst includes sub-nanoscale particles. As hydrogen gas diffuses from a source into the polymer matrix, the catalysts, such as transition metal particles, catalyze the disassociation of the hydrogen atoms which in turn reduce the dye molecules, effecting a shift in either or both of color and fluorescence (or other spectroscopic property) of the dye molecules. In the case of methylene blue, which possesses a deep blue color in its oxidized state, this reduction results in a shift from the blue to a colorless state, equimolar with $H_2$:

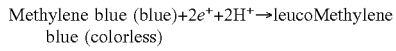
Methylene blue (blue)+$2e^-$+$2H^+$→leucoMethylene blue (colorless)

In the absence of sufficient $H_2$, re-oxidation of methylene blue by oxygen leads to a recovery of the blue color. Hydration of the hydrogen sensitive matrix facilitates the catalyst-mediated electron transport between hydrogen and dye.

In an embodiment, the catalyst, which includes transition metal particles, sulfonated Wilkinson's catalyst, colloidal Pt, sulfonated iridium cyclooctadiene triphenylphosphine, sulfonated rhodium cyclooctadiene triphenylphosphine, sulfonated ruthenium triphenylphosphine or combinations thereof, is included into the polymer matrix in a range from 0.01% by weight to 5% by weight. In another embodiment, the catalyst is included into the polymer matrix in a range from 0.01% by weight to 2% by weight. In another embodiment, the catalyst is included into the polymer matrix in a range from 0.05% by weight to 1.5% by weight. In another embodiment, the catalyst is included into the polymer matrix in a range from 0.5% by weight to 1.5% by weight. In another embodiment, the catalyst is included into the polymer matrix in a range from 0.01% by weight to 0.1% by weight.

Figure 2:
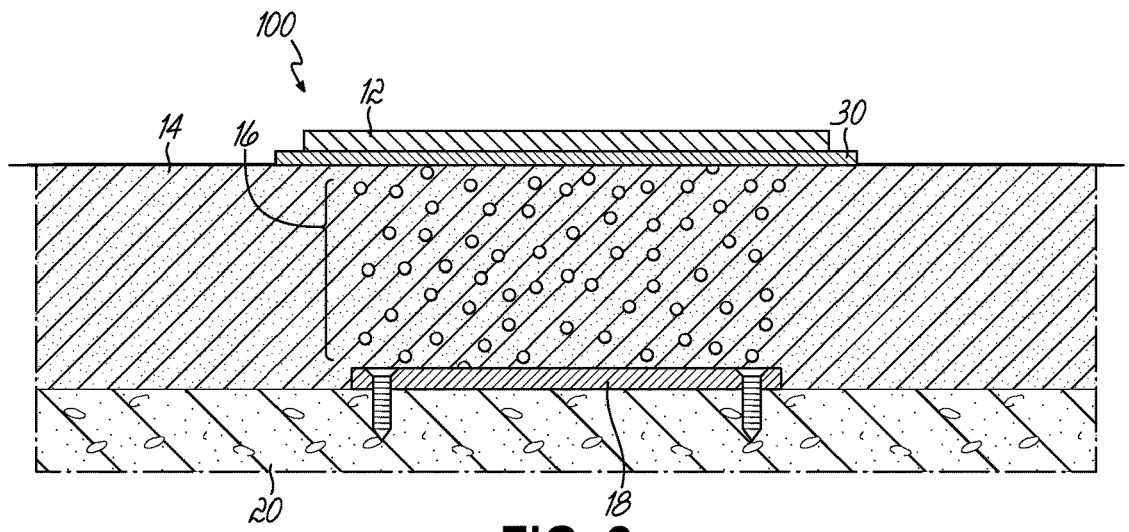
FIG. 2 is a cross-sectional view of a device according to another embodiment of the invention.

A further embodiment of the invention includes affixing the hydrogen sensitive matrix 12 to a hydrogen permeable membrane 30 (FIG. 2). The membrane 30 allows for easier application (such as pressing against) to potential hydrogen sources, and may be coated in whole or in part with an adhesive for this purpose. It may be opaque or transparent, and may be colored or made reflective to enhance the visualization of changes in the hydrogen sensitive matrix 12. The membrane 30 must be hydrogen permeable, to allow diffusion of hydrogen and for some applications should be sufficiently water-impermeable, to retard dehydration of the hydrogen sensitive matrix 12. An example of a membrane layer 30 material is a thin film of fluorinated ethylene propylene (FEP, aka: Teflon™ FEP, Neoflon™ FEP, Dyneon™ FEP) of approximately 0.001 inch (0.0254 mm) thickness. Other suitable fluoropolymers are (but not limited to) PTFE (polytetrafluoroethylene) and PFA (perfluoroalkoxy polymer resin). The membrane 30 may be held in place by shear, compression and tension forces applied by the adhesives of a supporting layer. If the membrane material and the application permit, surface modification of the membrane (either chemically or mechanically, as in solvent and/or plasma etching) may be performed on one or both sides to increase the adhesion between the membrane and the surrounding layers. Special care and consideration must be taken to not adversely affect the permeability of the membrane 30 to the hydrogen if such modification processes are employed. In embodiments of the invention, the membrane 30 may be cut from a sheet such as by mechanical (die-cut, hand-cut), optical (laser-cut), or other means. In embodiments of the invention, the membrane 30 may be chemically/physically deposited directly on the sensor or transferred to the sensor such as by vapor deposition methods, or may be coated directly to the sensor via spray-, spin-, or dip-coating procedures, or may be cast directly to the sensor or transferred to the sensor, or by any other means.

The hydrogen permeable membrane 30 may provide additional support and ease of application. Embodiments of the device include an additional supporting layer that is appropriately strong and flexible, and may be opaque or transparent. It may be covered in whole or in part by an adhesive to facilitate attachment of the sensor to a potential hydrogen source. An example of such a material is the 3M™ 1567 Polyester Double Sided Medical Tape produced by the 3M™ Medical Materials & Technologies division. This exemplary tape includes a 0.00092 inch (0.02337 mm) thick polyester backing film coated on two sides by a synthetic rubber (latex-free) adhesive measuring approximately 0.002 inch (0.0508 mm) thick, giving the entire bottom layer a thickness of approximately 0.005 inch (0.125 mm). The second coating of adhesive (not in contact with the skin) is used to bond additional layers of the device. In embodiments of the invention, the bottom layer may be cut from a carrier sheet such as by mechanical (die-cut, hand-cut), optical (laser-cut), or other means. In embodiments of the invention, the shape of the bottom layer may be tailored to fit and conform to the site of the body where monitoring will occur, and this shape dictates the overall shape of follow-on layers. In embodiments of the invention, the bottom layer also has one or more opening(s) cutout from its interior to provide a "window" for the sensor placement during assembly, and to facilitate the transport of the target analyte to the sensor itself. The size, number, and placement of the windows may vary depending on the site and nature of the monitoring Another embodiment of the invention incorporates a covering film 40 on the hydrogen sensitive matrix 12, on the face opposite that which will be exposed to hydrogen gas. The covering film 40 should be transparent, to allow measurement (such as visualization) of changes in the hydrogen sensitive matrix 12, and also sufficiently water impermeable, to adequately retard dehydration for the intended application. Depending on the intended application, this covering (or supporting) film 40 may be gas permeable or gas impermeable. A gas impermeable covering film 40 can result in irreversible detection, enhancing sensitivity or response time of the hydrogen sensitive matrix 12 by retarding competitive oxidation by $O_2$. A gas permeable covering film 40 allows for dynamic sensing, as changes in the levels of hydrogen gas to which the hydrogen sensitive matrix 12 is exposed will result in concomitant changes in the hydrogen sensitive matrix 12. Two examples of such materials are the 3M™ 9834 Clear Polyurethane Single Sided Medical Tape and the 3M™ 9834T Tan Polyurethane Single Sided Medical Tape produced by the 3M™ Medical Materials & Technologies division. Both of these exemplary tapes are constructed of a 0.0008 inch (0.02 mm) thick polyurethane backing film coated with a single layer of 0.001 inch (0.0254 mm) acrylic/acrylate adhesive, giving an overall single tape thickness of 0.0018 inch (0.05 mm). The 3M™ 9834(T) is considered a breathable liquid barrier, but may be modified to allow for venting if necessary. In embodiments of the invention, the cover layer 40 may be cut from a carrier sheet such as by mechanical (die-cut, hand-cut), optical (laser-cut), or other means. In embodiments of the invention, edge sealing between the cover layer 40 and the bottom layer 30 is desired. Edge sealing may be accomplished by applying the cover layer 40 to the device such as by using vacuum and/or foam/rubber press methods. Additionally, the cover layer 40 may be printed with alignment/reference/measuring marks and/or any logos, labels and device identification markings. In embodiments, screen printing or ink-jetting with inks suitable for wound care dressings may be used to apply these markings.

With reference to FIG. 1, an embodiment of the device 10 is directed to a hydrogen sensitive matrix 12 that may be applied to the surface of the skin 14 near a source of hydrogen gas 16, such as a magnesium alloy implant 18 affixed to a bone 20. The hydrogen sensitive matrix 12 includes a polymer matrix and a dye molecule. In embodiments of the invention, the hydrogen sensitive matrix 12 includes a polymer matrix, a dye molecule, and a catalyst.

With reference to FIG. 2, another embodiment of the device 100 is directed to a hydrogen sensitive matrix 12 and a hydrogen permeable membrane 30. The hydrogen permeable membrane 30 provides additional support to the hydrogen sensitive membrane 12 and allows hydrogen gas 16 to pass from the hydrogen gas source, in this case a magnesium alloy implant under the skin 14, to the hydrogen sensitive matrix 12.

Figure 3:
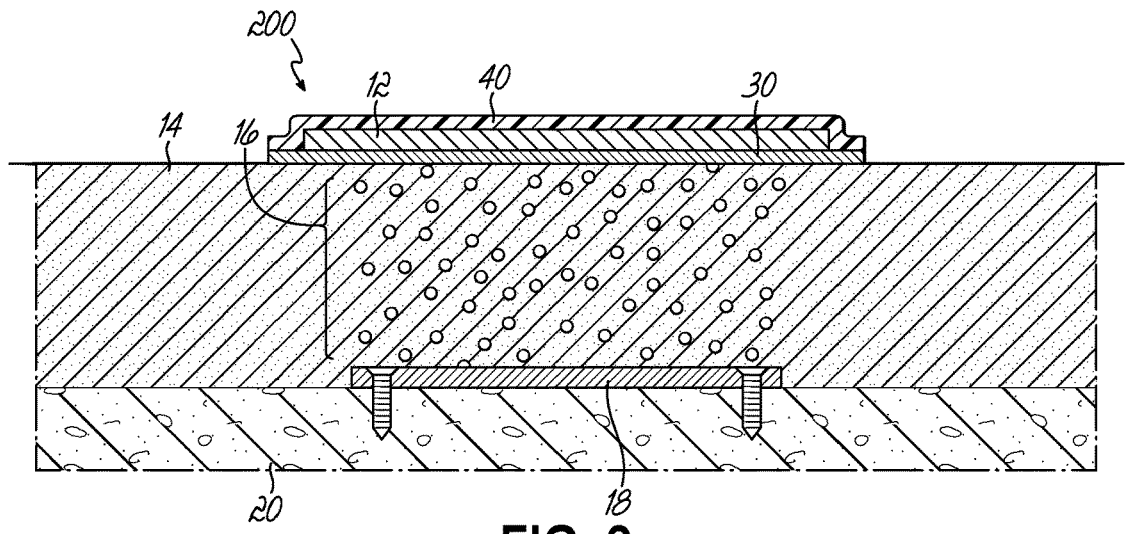
FIG. 3 is a cross-sectional view of a device according to another embodiment of the invention.

With reference to FIG. 3, another embodiment of the device 200 is directed to a hydrogen sensitive matrix 12, a hydrogen permeable membrane 30, and a covering film 40. The hydrogen sensitive matrix 12 is sandwiched between the hydrogen permeable membrane 30 and the covering film 40.

Embodiments of the device 10, 100, 200 are capable of detecting very low concentrations of hydrogen gas. In embodiments of the invention, the device is capable of detecting hydrogen gas concentration coming from a hydrogen gas source that corresponds to an aqueous hydrogen gas concentration as low as 10 µM. In another embodiment, the device is capable of detecting hydrogen gas concentration coming from a hydrogen gas source that corresponds to an aqueous hydrogen gas concentration as low as 100 µM. In another embodiment, device is capable of detecting hydrogen gas concentration coming from a hydrogen source that corresponds to an aqueous hydrogen gas concentration in a range from 10 µM to 100 µM.

EXAMPLES

Embodiments of the present invention are illustrated by the following examples, which should not be construed as limiting the scope of the invention.

Example 1

A solution composed of 1% by weight agarose with 0.4 µM methylene blue and 0.08% by weight colloidal Pt in deionized water was heated to boiling and cast as a cylinder monolith and allowed to cool, sealed, at ambient temperature and pressure. A circular film of 1 mm thickness was sliced from the end of the set gel. Under a directed stream of hydrogen gas, the film changed from blue to nearly colorless in less than 5 minutes. On removal from the hydrogen stream, the film regained its blue color in less than 5 additional minutes.

Example 2

A solution composed of 1% by weight agarose with 0.4 µM methylene blue and 0.08% by weight colloidal Pt in deionized water was heated to boiling and cast as a cylinder monolith and allowed to cool, sealed, at ambient temperature and pressure. A circular film of 1 mm thickness was sliced from the end of the set gel. The gel is affixed to an FEP membrane on the sensing side and then to a polyester tape supporting layer into which a sensing window has been cut. A transparent polyurethane film is used as a covering layer.

Example 3

A solution composed of 4% by weight Nafion polymer with 2 µM methylene blue and 0.4% by weight colloidal Pt in aliphatic alcohols was spin coated onto a glass slide at 2000 rpm for 30 seconds. After drying overnight under ambient conditions, the film was rehydrated in deionized water for 5 minutes prior to use. Under a directed stream of hydrogen gas, the film changed from blue to colorless in less than 5 minutes. On removal from the hydrogen stream, the film regained its blue color in less than 15 minutes.

Example 4

Figure 4:
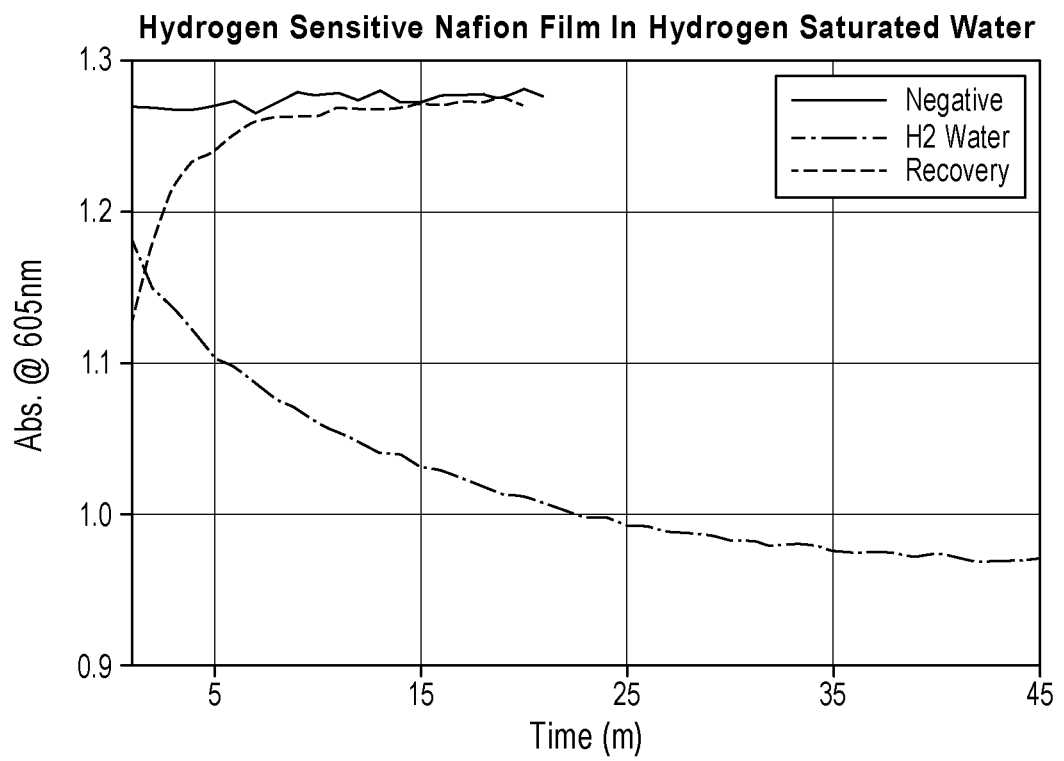
FIG. 4 is a graph illustrating recovery of embodiments of the invention.

A solution composed of 10% by weight Nafion polymer with 5 µM methylene blue and 1% by weight colloidal Pt in aliphatic alcohols was cast onto a glass slide and dried at 80 degrees Celsius for 4 hours, then annealed at 140 degrees Celsius for 16 hours. The resulting film was rehydrated in 1 M sulfuric acid for 3 hours. Exposed to hydrogen gas in a Franz diffusion cell, the film changed from dark blue to light blue in under 10 minutes, and regained its color in under 10 minutes when removed from the stream. The dominant absorbance peak of the film decreases continuously when expose to hydrogen saturated water, and recovers in less than 10 minutes when expose to deionized water (FIG. 4).

Example 5

Chemicals and Materials—All chemicals and materials were used as received. Resazurin ($C_{12}H_6NNaO_4$) dye was acquired from Fluka Chemika (Switzerland). Gold (III) chloride trihydrate ($HAuCl_4.3H_2O$, ≥99.9% trace metal basis), and potassium hexachloropalladate (IV) ($K_2PdCl_6$, 99% purity) were purchased from Sigma-Aldrich (MO). Trisodium citrate dihydrate ($Na_3C_6H_5O_7.2H_2O$) was obtained from Fisher Scientific (NJ). Nafion film (PO #5135501903, 254 µm thickness) was obtained from Ion Power (DE) and ultra-high purity hydrogen gas was obtained from Wright Brothers Inc. (OH). Aqueous solutions were prepared using purified water (≥18 MSΩ·cm).

Synthesis of Au—Pd Bimetallic Nanoparticles—Gold-palladium bimetallic nanoparticles (Au—Pd NPs) were synthesized by the co-reduction of Au and Pd ions via trisodium citrate dihydrate according to a published protocol with slight modifications. Three hundred and twelve µL of 20 mM $HAuCl_4.3H_2O$, and 312 µL of 20 mM $K_2PdCl_6$ were combined to a total volume of 50 mL in water and brought to a gentle boil under vigorous stirring. Three mL of 2% (m/V) trisodium citrate dihydrate was then added quickly, and the solution was left to boil under vigorous stirring for 15 minutes. The mixture changed from a faint brown to a dark purple-brown color over the course of ~5 minutes. The mixture was then cooled to room temperature and stirred vigorously for 10 minutes before being stored in the dark at ~4° C. until further use.

Nafion Thin Film Preparation—Four rectangular sheets of Nafion with approximate dimensions of 1 cm by 4.5 cm were cut out and immersed in aqueous solutions according to Table 1. Observations during film treatments were noted. After treatments, films were rinsed vigorously with water, then stored in water, in the dark, at room temperature until further use. Nafion films #1 through #4 were then dipped into separate vials containing ~15 mL of water in which $H_2$ gas had been bubbled for 10 minutes. Color changes were noted.

TABLE 1

Nafion film treatments

| Sample ID | Treatment | Observations in film color during treatment |
|---|---|---|
| Nafion film #1 | Immersion in water for 24 hrs | No change |
| Nafion film #2 | Immersion in 40 µM resazurin for 24 hrs | Transparent to orange color change |
| Nafion film #3 | Immersion in Au—Pd NP solution for 24 hrs | No change |
| Nafion film #4 | Immersion in Au—Pd NP solution for 24 hrs, then immersion in 40 µM resazurin for 24 hrs | No change during NP treatment, then a transparent to orange color change during resazurin treatment |

Exposure of Nafion films #1 through #4 to saturated $H_2$ (aq) and determining the limit of $H_2$ detection of Nafion film #4 via absorbance measurements—Known concentrations of $H_2$ gas dissolved in water (denoted $H_2$ (aq) from now on) were prepared and measured as described previously using an amperometric $H_2$ microsensor (Unisense $H_2$-NP-705273, Denmark) that was polarized at +800 mV for at least one hour and connected to a multimeter (Unisense, Denmark). The microsensor was calibrated per the manufacturer's recommendations where high purity $H_2$ gas was bubbled through ~100 mL of water for 20 minutes to form a 100% saturated $H_2$ (aq) solution constituting 800 µM $H_2$ at room temperature. From this solution, standards of 0, 8, 40, 100, 200, 400, and 600 µM were prepared via dilution with water. The microsensor tip was immersed in each $H_2$ (aq) standard, and 6 measurements of the steady state current were taken after at least 2 minutes to generate a picoampere current vs. $H_2$ concentration calibration curve. Nafion films #1 through #4 were exposed to saturated $H_2$ (aq) solutions and color changes were noted. A total of eight films fabricated exactly like Nafion film #4 were prepared, and a single film was immersed in $H_2$ (aq) standards of 0, 8, 40, 100, 200, 400, 600, and 800 µM concentration for 2 minutes. The UV-Vis absorbance signals of films at 635.95 nm for each $H_2$ (aq) concentration were measured in triplicate to generate an absorbance vs. $H_2$ concentration calibration curve used for calculating the limit of $H_2$ detection for film sensors.

Spectroscopic measurements—UV-Vis absorption spectra were collected by sandwiching films between two pieces of glass within the pathlength of a Cary 50 Bio UV-Vis spectrophotometer. UV-Vis spectra of aqueous resazurin, and Au—Pd NP solutions were collected by loading samples in a quartz cuvette. Excitation and emission spectra of Nafion films #1 through #4 were collected using a QM-40 spectrofluorometer (PTI). This was done by housing films in a quartz cuvette such that the face of the film was nominally positioned at a 45-degree angle with respect to the excitation source.

Figure 5:
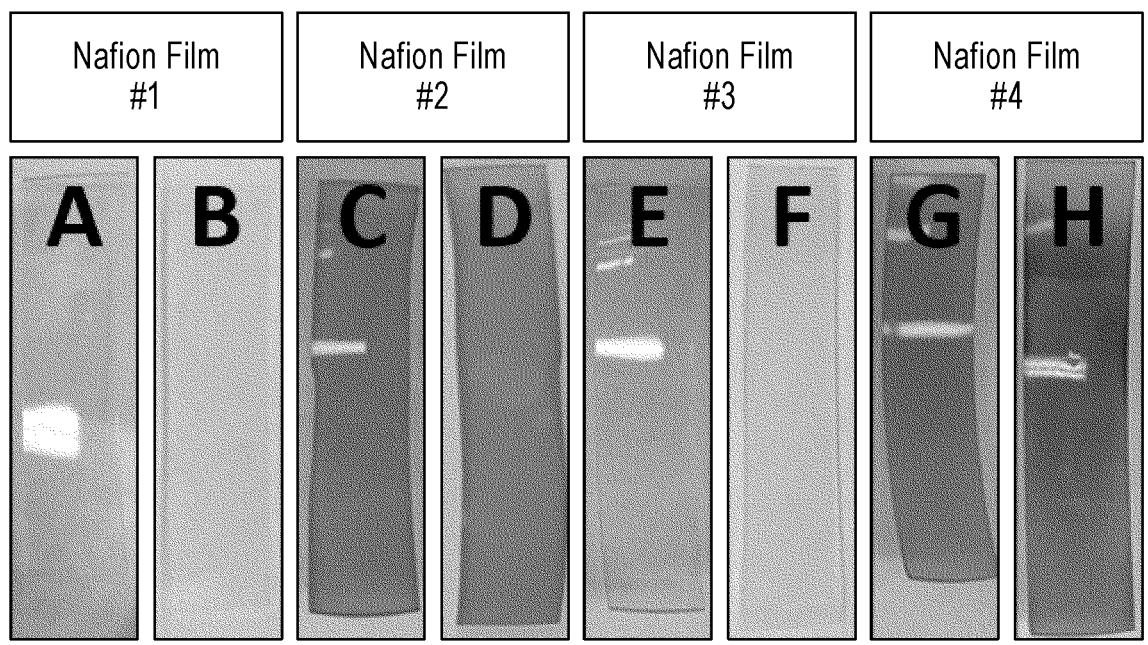
FIG. 5 is a panel of photographs of an embodiment of the invention.

Visual $H_2$ detection via Nafion film containing nanoparticles and dye—FIG. 5 shows photographs of Nafion films #1 through #4 before (A, C, E, and G) and after (B, D, F, and H) exposure to saturated $H_2$ (aq). The orange colored films in C and G suggest successful uptake of resazurin dye into the film. Nafion film #4, which was treated with Au—Pd NPs and resazurin, changed from an orange color to a bluish-green color in a matter of seconds upon exposure to saturated $H_2$ (aq); thus, making this material potentially suitable for the $H_2$ sensing applications described above. Nafion films #1, #2, and #3 did not change color by eye upon exposure to $H_2$ which demonstrates two important properties of Nafion film #4. Firstly, the visual color change from orange (G) to blue-green (H) is specific to $H_2$. Secondly, this color change occurs rapidly when both the Pd containing nanoparticles, which catalyze the reduction of the dye to a different color in the presence of $H_2$, and dye are contained within the thin film.

Figure 6A:
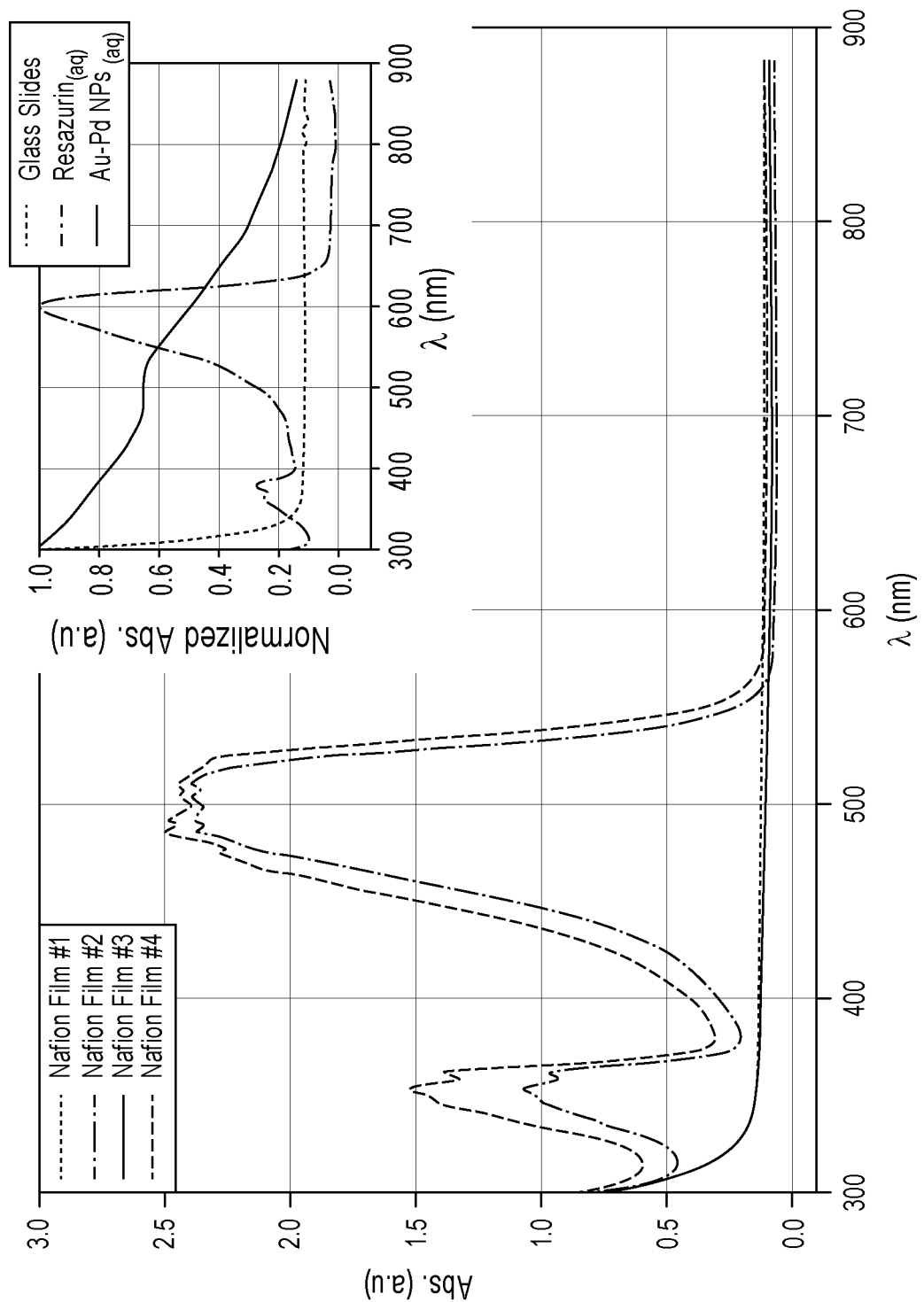
FIG. 6A is a UV-Vis spectra from the embodiment shown in FIG. 5 before exposure to hydrogen gas saturated water.
Figure 6B:
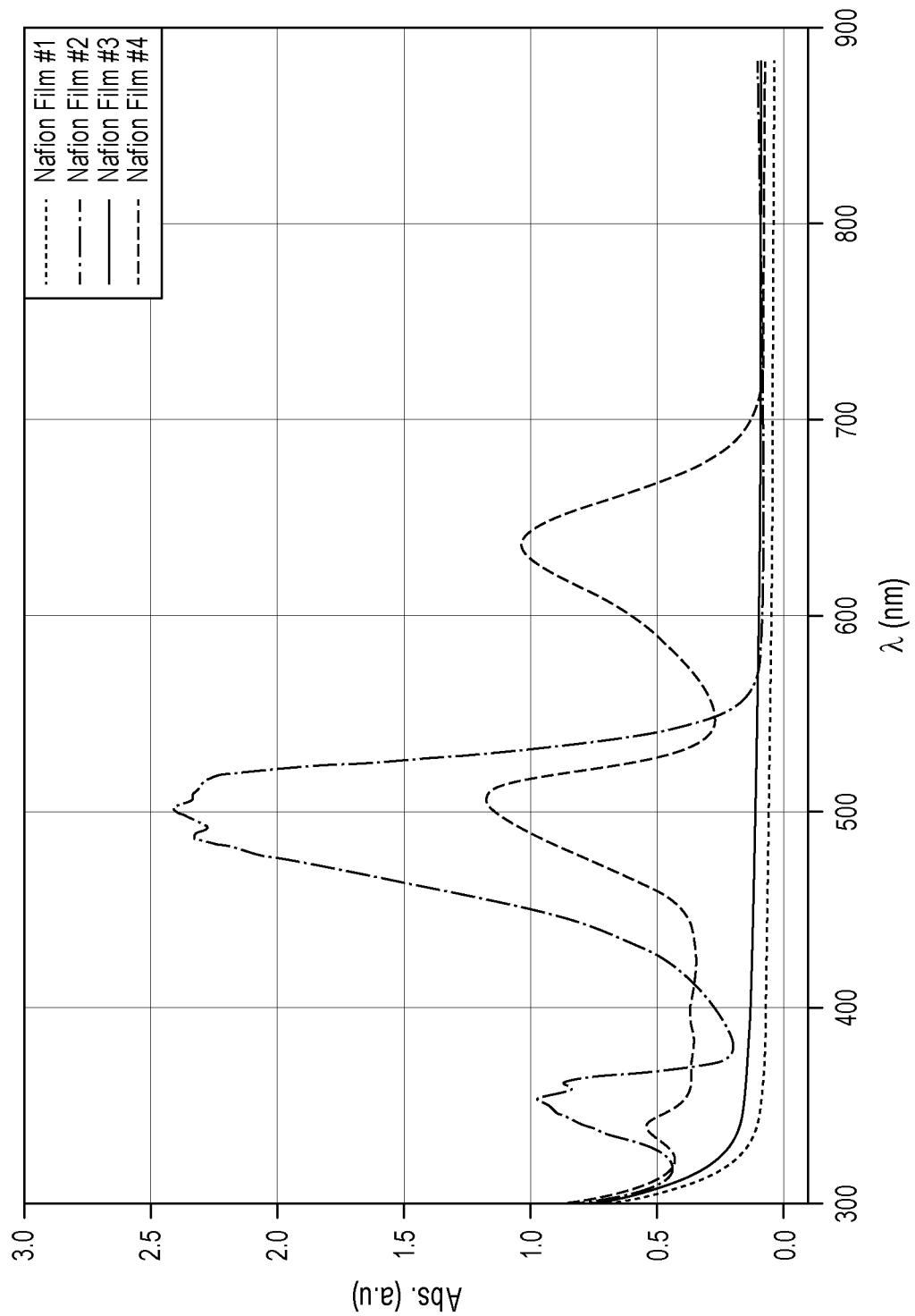
FIG. 6B is a UV-Vis spectra from the embodiments shown in FIG. 5 after exposure to hydrogen gas saturated water.

Spectroscopic characterizations of films before and after exposure to $H_2$—The UV-Vis spectra of Nafion films #1 through #4 before (FIG. 6A) and after (FIG. 6B) exposure to saturated $H_2$ (aq). The inset of FIG. 6A shows normalized spectra of the glass slides used in all film measurements, resazurin$_{(aq)}$, and Au—Pd NP$_{(aq)}$ solutions; all of which were not exposed to $H_2$. Strong absorption bands at ~350 and ~500 nm were evident for Nafion films #2 and #4 before exposure to $H_2$ (FIG. 6A). These peaks were attributed to the presence of resazurin molecules within the films and, quite interestingly, are ~100 nm blue shifted with respect to the absorption peak of pure resazurin$_{(aq)}$ (inset of FIG. 6A). These blue shifts are hypothesized to occur due to the highly ordered arrangement of dye molecules within the film structure. The presence of Au—Pd NPs within Nafion films #3 and #4 could not be confirmed by UV-Vis spectroscopy since the broad band around ~520 nm for NPs in solution (inset of FIG. 6A) could not be detected for Nafion film #3, and the large peak at ~500 nm for Nafion film #4 (FIG. 6A main figure) significantly overlapped the spectral region of the Au—Pd NPs. However, Nafion film #4 is the only sample that showed a dramatic change in the UV-Vis spectra after exposure to saturated $H_2$ (aq) since the absorption peak at ~500 nm decreased significantly and a new absorption peak at 635.95 nm, corresponding to the blue-green color change, developed after film exposure to $H_2$ (FIG. 6B).

Figure 7A:
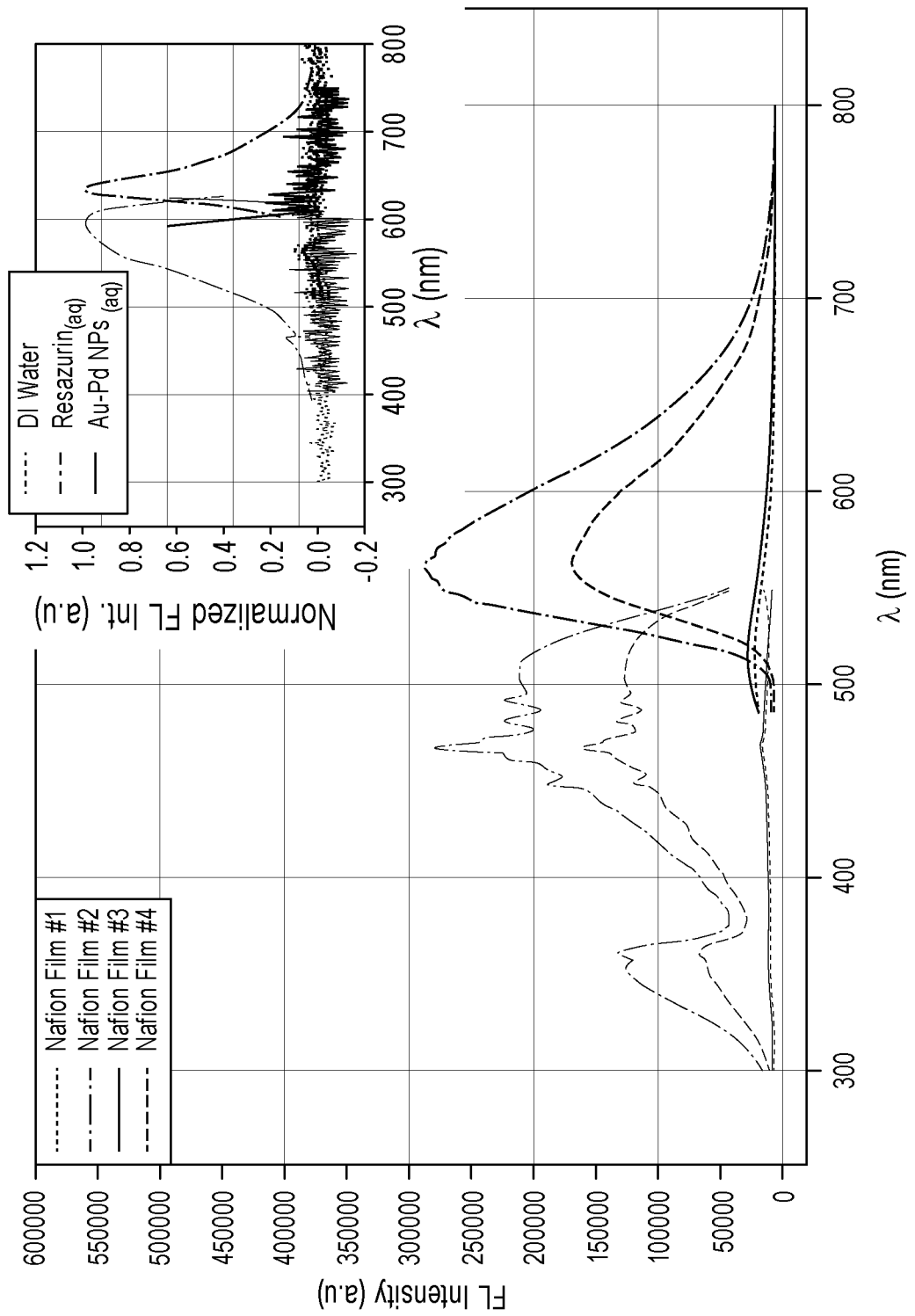
FIG. 7A is the excitation (dashed lines) and emission (solid lines) spectra from the embodiments shown in FIG. 5 before exposure to hydrogen gas saturated water.
Figure 7B:
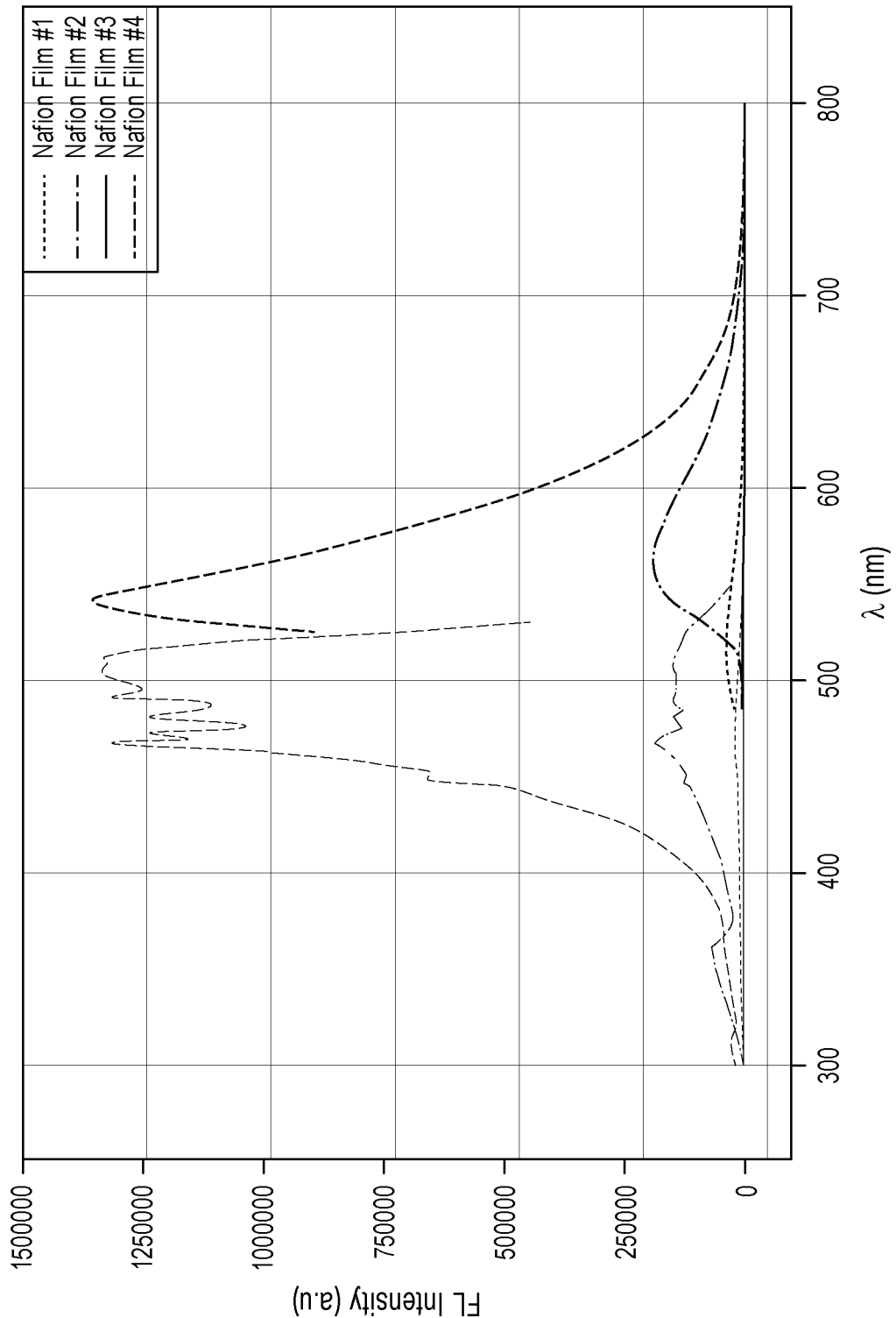
FIG. 7B is the excitation (dashed lines) and emission (solid lines) spectra from the embodiments shown in FIG. 5 after exposure to hydrogen gas saturated water.

Excitation (dashed line) and emission (solid line) spectra of Nafion films #1 through #4 before (FIG. 7A) and after (FIG. 7B) exposure to saturated $H_2$ (aq). The inset of FIG. 7A shows normalized excitation and emission spectra of DI water, resazurin$_{(aq)}$, and Au—Pd NP$_{(aq)}$ solutions. The DI water and Au—Pd NP$_{(aq)}$ spectra are offset for clarity. Emission peaks at ~562 nm were detected for Nafion films #2 and #4 at 467 nm excitation, and these emission peaks were attributed to the fluorescence of resazurin molecules within the film. The excitation and emission peaks of Nafion films #2 and #4 are markedly blue shifted with respect to the peaks of pure resazurin$_{(aq)}$ (inset of FIG. 7A) possibly due to the highly ordered arrangement of dye molecules within the film structure. Similar to the UV-Vis results, Nafion film #4 is the only sample with a dramatic change in the emission spectra after exposure to $H_2$ where the peaks blue shift from 562 nm before $H_2$ exposure (FIG. 7A) to 542 nm after $H_2$ exposure (FIG. 7B). From a quantitative perspective, the magnitude of the emission peak for this sample increases by a factor of ~8 upon exposure to saturated $H_2$ (aq). The excitation peak of this sample changes from 467 nm (FIG. 7A) to 500 nm (FIG. 7B) before and after $H_2$ exposure; respectively. The drastic changes in the UV-Vis and fluorescence emission spectra of Nafion film #4 upon exposure to $H_2$ make this material an excellent candidate for $H_2$ sensing.

Figure 8A:
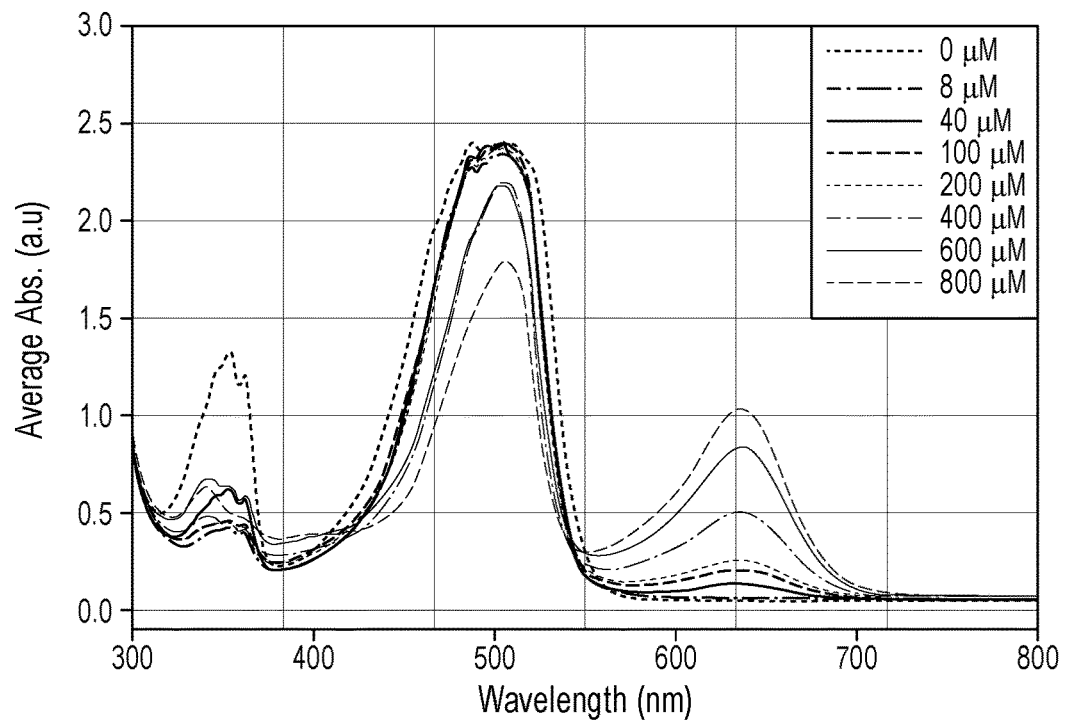
FIG. 8A is the average UV-Vis spectra taken from three regions of each film shown in FIG. 5 after 2 minutes of exposure to hydrogen gas saturated water.
Figure 8B:
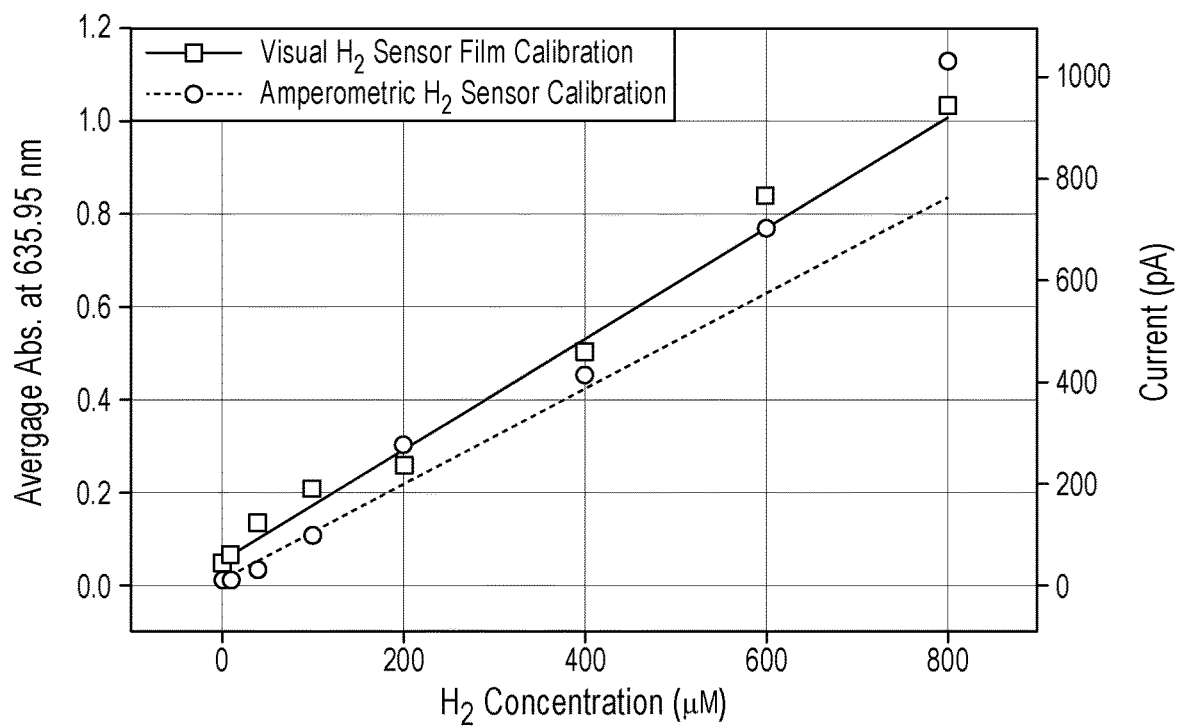
FIG. 8B is a calibration curve for visual data from FIG. 8B (solid line) and amperometric $H_2$ sensor measurements (dashed line)

Determining the limit of detection of $H_2$ sensitive films via absorbance measurements—The peak at 635.95 nm in the UV Vis spectra of Nafion film #4 corresponds to the unique color change upon film exposure to $H_2$ (aq). The relationship between the magnitude of this peak and the concentration of $H_2$ (aq) was tested by fabricating eight films exactly like Nafion film #4 from Table 1 then exposing a single film to 0, 8, 40, 100, 200, 400, 600, and 800 μM $H_2$ (aq) for 2 minutes and measuring the absorbance signal at 635.95 nm. The magnitude of the peak at 635.95 nm was observed to increase with increasing $H_2$ (aq) concentration (FIG. 8A), and when plotting this absorbance signal vs. $H_2$ (aq) concentration (FIG. 8B, left ordinate y-axis, □ data points), the relationship was linear. For comparison, calibration data for a commercial amperometric $H_2$ sensor (FIG. 8B, right ordinate y-axis, ○ data points) was compared to that of the absorbance-based visual $H_2$ sensor film calibration. The detection limits (DL) and lower limits of quantification (LLQ) for each calibration curve in FIG. 8B were calculated using equations 1 and 2; respectively, where s is the standard deviation in the blank signal and m is the slope of the calibration curve.

$$DL = 3s \cdot m^{-1} \quad (1)$$

$$LLQ = 10s \cdot m^{-1} \quad (2)$$

The visual $H_2$ sensor film had a DL of 8 μM and a LOQ of 27 μM while the amperometric $H_2$ sensor had a DL of 0.1 μM and an LOQ of 0.3 μM. These results demonstrate how the visual $H_2$ sensor films are potentially suitable for the $H_2$ sensing applications described above.

Figure 9:
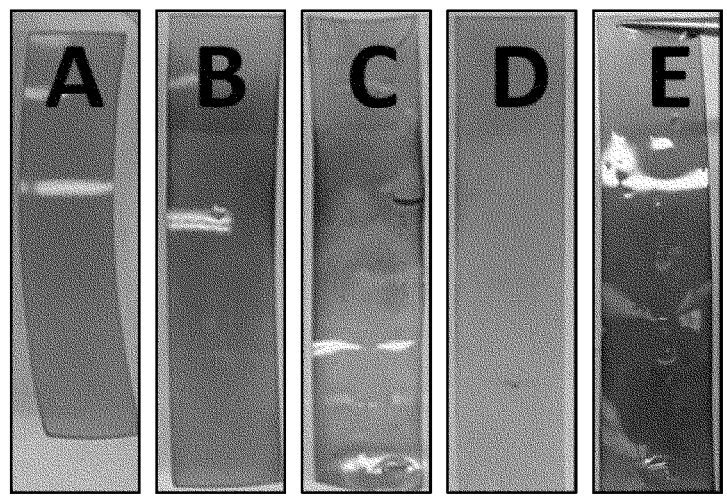
FIG. 9 is a series of photographs showing the potential reusability of films produced in accordance with embodiments of the invention.

Potential reusability of visual $H_2$ sensor—The visual color change for Nafion film #4 upon exposure to $H_2$ (FIG. 5, films G and H) was observed to be a chemically reversible process and makes the sensor potentially reusable. FIG. 9 is a series of photographs that demonstrates how the sensor was re-used for visual $H_2$ detection. First, FIG. 9 includes photographs of Nafion film #4 were made before (A) and after (B) exposure to saturated $H_2$ (aq). The film was left to dry in air for ~20 minutes (C) and the blue-green color faded while the film started to change back to an orange color. Next, the film was left to dry in air, in the dark, overnight (D), and the film was exposed to saturated $H_2$ (aq) for a second time (E). The formation of a greenish color was observed. These results demonstrate how the materials comprising Nafion film #4 are viable for reusable and visual $H_2$ sensing applications.

Example 6

Chemicals and materials—All chemicals and materials were used as received. Resazurin ($C_{12}H_6NNaO_4$) dye was acquired from Fluka Chemika (Switzerland). Gold (III) chloride trihydrate ($HAuCl_4 \cdot 3H_2O$, ≥99.9% trace metal basis), and potassium hexachloropalladate (IV) ($K_2PdCl_6$, 99% purity) were purchased from Sigma-Aldrich (MO). Trisodium citrate dihydrate ($Na_3C_6H_5O_7 \cdot 2H_2O$) and petri dishes (60×15 mm polystyrene) were purchased from Fisher Scientific (NJ), while molecular biology grade agarose was obtained from AE Bios. Ultra-high purity hydrogen gas was purchased from Wright Brothers Inc. (OH). Aqueous solutions were prepared using purified water (≥18 MΩ·cm).

Synthesis of Au—Pd bimetallic nanoparticles—Gold-palladium bimetallic nanoparticles (Au—Pd NPs) were synthesized exactly as described in Example 5.

Figure 10:
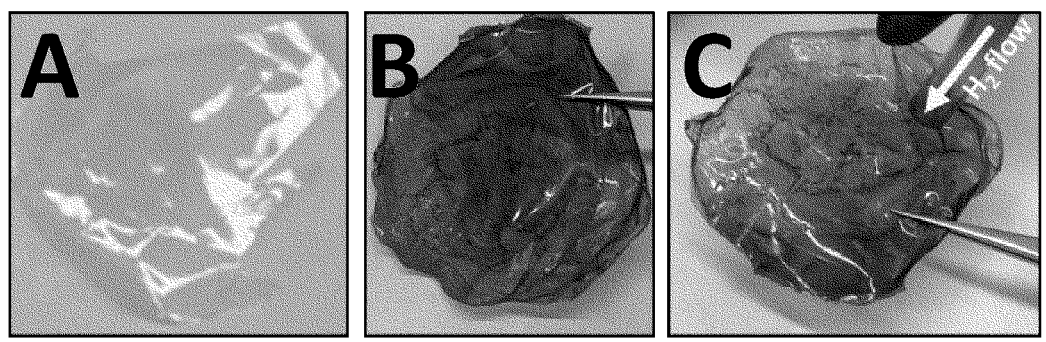
FIG. 10 is a series of photographs of agarose thin film (A), agarose thin film with Au—Pd bimetallic nanoparticle catalyst and resazurin before (B) and after (C) exposure to hydrogen gas.

Agarose thin film preparation and exposure to $H_2$—A 1.5% (m/V) solution of agarose$_{(aq)}$ was autoclaved (Yamato Scientific, SM300) at 120° C. for 30 minutes. Ten mL of this solution was dispensed into a 60 mm plastic petri dish and left to dry in a hood at room temperature overnight to form a thin agarose film (FIG. 10, panel A). Next, 3 mL of as-prepared Au—Pd NP solution was dispensed into the petri dish containing the dried agarose film and the mixture was left to dry in the hood at room temperature overnight. Doing so re-dissolved the agarose and allowed the Au—Pd NPs to be incorporated within the thin film upon drying. Finally, 3 mL of 100 μM resazurin (aq) was added to the dried agarose/Au—Pd thin film from the previous step, thus re-dissolving the film once more and allowing both the Au—Pd NPs and resazurin molecules to be incorporated within the agarose thin film upon drying (FIG. 10, panel B). The agarose/Au—Pd NP/resazurin thin film was dipped in water quickly, then high purity $H_2$ was blown over top of the film (FIG. 10, panel C). Color changes were noted.

Visual $H_2$ detection via agarose film containing nanoparticles and dye—FIG. 9 shows photographs describing the fabrication of a visual $H_2$ sensor comprised of an agarose thin film containing resazurin and Au—Pd NPs. Upon exposing the wet agarose/Au—Pd NP/resazurin thin film to $H_2$ (Panel C), a color change from royal blue to bright pink was observed. These results demonstrate how a thin film containing agarose, resazurin, and Au—Pd NPs are viable visual $H_2$ sensors.

This has been a description of the present invention along with a preferred method of practicing the present invention, however the invention itself should only be defined by the appended claims.

What is claimed is:

1. A hydrogen sensor comprising:
a polymer matrix and a dye molecule in an amount sufficient such that exposure of the polymer matrix to hydrogen gas causes a change in a spectroscopic property of the dye molecule wherein the spectroscopic property includes at least one of color, absorbance, or luminescence;
wherein the polymer matrix further includes a catalyst in an amount sufficient to catalyze the change in spectroscopic property of the dye molecule upon exposure to hydrogen gas.

2. The sensor of claim 1 wherein the dye molecule is a polyaromatic compound containing a redox-sensitive chromophore or fluorophore.

3. The sensor of claim 1 wherein the dye molecule is selected from the group consisting of methylthioninium chloride (methylene blue), resazurin ($C_{12}H_6NNaO_4$), neutral red, methyl orange, crystal violet, Victoria blue, Evan's blue, bromophenol blue, thymol blue, orange II, or combinations thereof.

4. The sensor of claim 1 wherein the polymer matrix is selected from the group consisting of agarose, Nafion™ copolymer-fluoropolymer, sulfonated polystyrene-block-poly(ethylene-ran-butylene)-block-polystyrene, poly(vinylbenzene trimethylammonium) chloride, poly(dimethyldiallylammonium chloride), poly(styrenesulfonic acid), quaternized poly(4-vinylpyridine), polyvinyl alcohol, or polyacrylic acid.

5. The sensor of claim 1 wherein the polymer matrix is principally composed of one or Nafion™ copolymer-fluoropolymer or agarose.

6. The sensor of claim 1, wherein the catalyst is a transition metal, sulfonated Wilkinson's catalyst, colloidal Pt, sulfonated iridium cyclooctadiene triphenylphosphine, sulfonated rhodium cyclooctadiene triphenylphosphine, sulfonated ruthenium triphenylphosphine, or combinations thereof.

7. The sensor of claim 1 wherein the catalyst is a nanoparticle, a microparticle, a sub-nanoparticle, or combinations thereof.

8. The sensor of claim 1 wherein the catalyst is a transition metal selected from the group consisting of palladium (Pd), platinum (Pt), ruthenium (Ru), rhodium (Rh), palladium (Pd), iridium (Ir) or combinations thereof.

9. The sensor of claim 1 wherein the catalyst includes at least two transition metals selected from the group consisting of gold (Au), palladium (Pd), platinum (Pt), ruthenium (Ru), rhodium (Rh), palladium (Pd), iridium (Ir) or combinations thereof.

10. The sensor of claim 9, wherein the catalyst is a bimetallic catalyst comprising gold and palladium.

11. The sensor of claim 1 further comprising a gas-permeable, water-impermeable membrane affixed to the polymer matrix.

12. The sensor of claim 11, further comprising an adhesive coated on a surface of the gas-permeable membrane opposite that to which the polymer matrix is affixed.

13. The sensor of claim 11 wherein the gas-permeable membrane is colored or reflective to improve visualization of the dye molecule in the polymer matrix.

14. The sensor of claim 11 further comprising a supporting layer to which the polymer matrix and membrane are affixed.

15. The sensor of claim 14, wherein the surface of the supporting layer opposite that to which the polymer matrix is affixed is coated, in whole or in part, in adhesive.

16. The sensor of claim 1, further comprising an optically transparent layer covering or coating the exterior, non-sensing surface of the polymer matrix.

17. The sensor of claim 1 wherein the change in spectroscopic property is reversible.

18. A method for detecting hydrogen gas comprising;
coupling a hydrogen gas sensitive matrix comprising a polymer matrix and a dye molecule adjacent to a potential source of hydrogen gas, wherein the hydrogen gas sensitive matrix further includes a catalyst;
observing a change in a spectroscopic property wherein the spectroscopic property includes at least one of color, absorbance, or luminescence indicative of the presence of hydrogen gas from the hydrogen gas source.

19. The method of claim 18 wherein the hydrogen gas sensitive matrix is coupled to the skin of a subject overlying a magnesium alloy implant.

* * * * *

UNITED STATES PATENT AND TRADEMARK OFFICE
CERTIFICATE OF CORRECTION

PATENT NO. : 10,935,499 B2
APPLICATION NO. : 16/143992
DATED : March 2, 2021
INVENTOR(S) : William R. Heineman et al.

It is certified that error appears in the above-identified patent and that said Letters Patent is hereby corrected as shown below:

In the Specification

Column 4, Line 12, "such by mixing" should be -- such as by mixing --.

Column 4, Line 66, "(blue)+2e$^+$" should be -- (blue)+2e$^-$ --.

Column 6, Lines 18-19, "nature of the monitoring Another embodiment" should be -- nature of the monitoring. Another embodiment --.

Column 8, Line 22, "expose" should be -- exposed --.

In the Claims

Column 12, Lines 66-67 (Claim 5), "composed of one or Nafion™ copolymer-fluoropolymer or agarose." should be -- composed of one of Nafion™ copolymer-fluoropolymer or agarose." --.

Column 14, Line 14 (Claim 18), "A method for detecting hydrogen gas comprising;" should be -- "A method for detecting hydrogen gas comprising: --.

Signed and Sealed this
Eighth Day of June, 2021

Drew Hirshfeld
*Performing the Functions and Duties of the
Under Secretary of Commerce for Intellectual Property and
Director of the United States Patent and Trademark Office*